(12) United States Patent
Brinciotti et al.

(10) Patent No.: US 9,476,784 B2
(45) Date of Patent: Oct. 25, 2016

(54) OPTICAL SENSOR FOR CONTACTLESS PRESSURE MEASUREMENTS

(71) Applicant: Laser Point s.r.l., Vimodrone (IT)

(72) Inventors: Andrea Brinciotti, Usmate Velate (IT); Lucio Cibinetto, Carate Brianza (IT)

(73) Assignee: LASER POINT S.R.L., Vimodrone (MI) (IT)

( * ) Notice: Subject to any disclaimer, the term of this patent is extended or adjusted under 35 U.S.C. 154(b) by 0 days.

(21) Appl. No.: 14/441,595

(22) PCT Filed: Jan. 30, 2014

(86) PCT No.: PCT/EP2014/051762
§ 371 (c)(1),
(2) Date: May 8, 2015

(87) PCT Pub. No.: WO2014/049178
PCT Pub. Date: Apr. 3, 2014

(65) Prior Publication Data
US 2015/0285699 A1    Oct. 8, 2015

(30) Foreign Application Priority Data
Jan. 31, 2013   (IT) .............................. MI2013A0138

(51) Int. Cl.
*G01L 9/00* (2006.01)
*G01L 7/00* (2006.01)
*G01L 7/08* (2006.01)
*G01L 11/02* (2006.01)

(52) U.S. Cl.
CPC ................ *G01L 7/086* (2013.01); *G01L 11/02* (2013.01)

(58) Field of Classification Search
None
See application file for complete search history.

(56) References Cited

U.S. PATENT DOCUMENTS

| | | | |
|---|---|---|---|
| 4,071,753 A | 1/1978 | Fulenwider et al. | |
| 4,620,093 A | 10/1986 | Barkhoudarian et al. | |
| 4,678,902 A | 7/1987 | Perlin | |
| 5,390,546 A | 2/1995 | Wlodarczyk | |
| 5,438,873 A | 8/1995 | Wlodarczyk et al. | |
| 5,600,070 A | 2/1997 | Wlodarczyk | |
| 6,131,465 A | 10/2000 | Wlodarczyk et al. | |
| 8,074,501 B2* | 12/2011 | Kummer | G01L 9/0077 73/114.19 |
| 8,151,648 B2* | 4/2012 | Yu | G01L 9/0079 29/592 |
| 8,740,432 B2* | 6/2014 | Yalin | G02B 6/028 362/259 |

(Continued)

FOREIGN PATENT DOCUMENTS

| | | |
|---|---|---|
| EP | 1 089 062 A1 | 4/2001 |
| JP | H09 243935 A | 9/1997 |
| JP | 2005 292045 A | 10/2005 |

*Primary Examiner* — Michael A Lyons
*Assistant Examiner* — Jermaine Jenkins
(74) *Attorney, Agent, or Firm* — Jacobson Holman, PLLC.

(57) ABSTRACT

An optical sensor for pressure measurements comprises a sensor head including: a diaphragm having a first surface in contact with a fluid of which the pressure has to be measured and a second surface opposite to the first surface, a body with a tubular cavity, means arranged inside the tubular cavity, associated with the second surface of the diaphragm and movable longitudinally inside said tubular cavity in response to deformation of the diaphragm, said means including a reflective surface, an end part of waveguide means arranged inside the tubular cavity and having the end surface faced to and not in contact with the reflective surface of said means, said waveguide means being connected to a light source and a receiver respectively to send to said means the light beam deriving from the light source and to collect at the receiver the light beam reflected from the reflective surface.

10 Claims, 5 Drawing Sheets

(56) References Cited

U.S. PATENT DOCUMENTS 8,966,988 B2 * 3/2015 Yu .................. G01L 9/0079
  73/705

8,973,445 B2 * 3/2015 MacDougall ......... G01L 9/0077
  73/705
2011/0075976 A1 * 3/2011 Sutherland ........... G02B 6/4214
  385/88

* cited by examiner

OPTICAL SENSOR FOR CONTACTLESS PRESSURE MEASUREMENTS

BACKGROUND OF THE INVENTION

Optical sensors for pressure measurement may be generally divided into two main different families according to the different approach used to measure the pressure parameter: "Interferometric" and "Intensity modulated" optical sensors. In the "Interferometric" optical sensors, the pressure is measured by the phase change between the incoming optical probe beam and the out-coming from an optical pressure sensing element (using Bragg, Fabry-Perot, Michelson, Mach-Zehnder interferometers). In the "Intensity modulated" optical sensors, the pressure is directly measured by the intensity change between the incoming optical probe beam and the out-coming one from an optical pressure sensing element (typically a reflective surface of a pressure sensing diaphragm) In the "Intensity modulated" optical sensors, fiber optic is used to drive incoming optical beam in front of the pressure sensing reflective diaphragm and to collect the light beam reflected by the diaphragm itself.

"Interferometric" sensors have the advantage to measure pressure with an higher resolution than the "Intensity modulated" ones but on the other side, "Interferometric" sensors are more sensitive to mechanical vibrations (often present in industrial environment) and less reliable due to the use of more complicated optical design related to the interferometers. The use of interferometer and the need of a coherent LASER source makes the "Interferometric" sensors even more expensive than the rocky and robust optical "Intensity modulated" sensor where low cost not-coherent LED source may be used.

Optical sensors allow performing pressure measurement in a contactless conditions, making these sensors very interesting for all the applications where fast and periodic pressure changes have to be continuously monitored as in the engine cylinder combustion chamber in the automotive field.

Optical sensors are strongly insensitive to Electro-Magnetic Interference often present in the measuring area in the industrial environment, being the optical probe used to reach the measurement area just based on a fiber optic, which is electrically passive and intrinsically insensitive to EMI problems; for these optical sensors, all the active devices needed to perform optical signal transmission and detection are located far enough away from the pressure measurement area and, typically in a controlled location where EMI problems are not present anymore, eliminating the signal degradation due to EMI or RF Interference.

Pressure measurement performed using an optical sensor in a contactless way and with no need of any active electronic devices in the area where pressure have to be monitored, increases a lot the overall reliability of the sensor itself, making this kind of sensor very appealing for the use in industrial environment where harsh conditions due to extremely high process temperatures are reached as in plastic extrusion, injection and blow molding applications or in automotive applications when pressure measurement in engine cylinder combustion chamber has to be monitored. Said pressure measurement increase a lot the safety in industrial areas with harsh conditions due to the presence of explosive and flammable gas or materials.

Optical sensors using Single Mode Fibers as transmission media, allow performing pressure measurements up to distances of tens of kilometers, making this sensor very appealing for pressure measurement in oil rig, well drilling systems and oil pipeline.

Also the optical sensor allows measuring very high pressure levels because the pressure transducer is based on a deformable pressure sensing diaphragm whose deformation with pressure may be changed modifying its thickness and pressure at high temperature without using mercury (Hg) or other potentially dangerous fluids, and so to be fully compliant with RoHS directive.

Other type of sensors for pressure measurement, the "Piezoelectric" or "Piezo-resistive" pressure sensors, have been developed before the advent of the optical sensors. The physical principle used in "Piezoelectric" electronic sensors is the Piezoelectric effect, shown by some specific crystals (piezoelectric crystals), where a change in the pressure applied to the crystal along a specific direction, produces a voltage change on the crystal itself which is a measure of the pressure applied. In the "Piezo-resistive" electronic pressure sensors, the pressure change is measured by the resistor change induced by pressure typically on a Wheatstone bridge. Even if both kinds of these sensors are widely used in industrial environment where harsh conditions are reached, many of the previous listed advantages are not applicable anymore for this kind of sensors; specifically, this sensor needs a mechanical contact between the transducer chip and the pressure sensing diaphragm. The transducer chip is an active electronic device that needs to be placed very close to the area where pressure has to be monitored (typically few millimeters from the pressure sensing diaphragm); for this reason its reliability is reduced when it works in areas with harsh conditions related to very high temperatures and it needs to be electrically powered. Even if the transducer chip is typically shielded in a metal enclosure avoiding EMI problems, the electronics needed for detection and signal conditioning can still suffer of EMI problems, because it has to be still close enough to the transducer chip box to avoid degradation of small amplitude signal using long and expensive electrical cables. Finally each pressure range to be measured, needs a dedicated design of the transducer chip reducing the possibility to make volume scale economy with the related product cost saving.

U.S. Pat. No. 4,071,753 discloses the general bases of a transducer able to change the optical coupling coefficient according to the acoustic or mechanical energy received; the transducer element is arranged between two different fibers, the first one used as input fiber to provide the incoming optical beam to the transducer element and the second one used as output fiber to receive the optical beam after the transducer element. Changing the optical coupling coefficient according to acoustic or mechanical energy, allows the transducer to convert this energy change into an optical intensity modulated signal. Many other patents disclosed similar inventions based on two or more fiber optic.

U.S. Pat. No. 4,620,093 discloses an optical pressure sensor where a diffraction grating is built on the surface of the deformable with pressure diaphragm; the grating is illuminated by an optical beam from the input fiber optic and the reflected beam from the grating is collected using an output fiber optics ribbon to provide the modulated intensity signal to a photo-position detector able to detect the position change of the diffracted beam. Optical sensor design based on multiple fibers or ribbon is more complicated, more difficult to manufacture with a reliable mass production process and even more complicated to be integrated in smaller size than a single fiber based optical sensor solution.

U.S. Pat. Nos. 5,600,070, 6,131,465, 5,390,546 disclose fiber optics sensor for pressure measurement inside engine combustion chamber using reflective diaphragm and a single fiber approach in order to be integrated in the small site available in the spark plug. Increasing the Signal to Noise Ratio (SNR) and the Sensitivity of the sensor is a very important factor, specifically when small deformations of pressure sensing diaphragm have to be detected measuring the variation of the reflected optical signal. This is more and more important when optical sensor is used to measure high pressure levels (100-1000 Bar) in a reliable way; as matter of fact, when such high pressure levels have to be measured, the pressure sensing diaphragm needs to be thick enough to avoid its breaking with the high pressure action. On the other side, when the thickness of the diaphragm is increased, its deformation range is sensibly reduced and the detection of the intensity variation of the optical reflected signal may be very critical, if a not proper level of SNR and sensitivity are reached. To provide an order of magnitude, 15µm is a typical total diaphragm displacement when a 0-500 Bar pressure range have to be measured in a reliable way using a 1 mm thick steel circular diaphragm with 3.5 mm radius which is mechanically compatible with standard requirement for pressure sensor in extrusion machines; if a 10 Bar resolution is needed, this means the sensor should be able to optically detect 0.3 um displacement.

U.S. Pat. No. 4,678,902 discloses a pressure optical sensor based on a single fiber optic and a reflective diaphragm, where the sensitivity is improved by expanding the light cone coming from a circular shape fiber end surface, further on projected to the reflective diaphragm.

U.S. Pat. No. 5,438,873 discloses a similar pressure optical sensor based on a single fiber optic and a reflective diaphragm, where the improved sensitivity is reached by using a tapered fiber with flat end surface allowing to increase the Numerical Aperture (N. A.) of the fiber on a similar bases of the previous invention.

The prior art optical sensors cannot be used in industrial environment where harsh conditions due to extremely high process temperatures are reached; in fact, this is due to the limited temperature operating range of the available glues and materials needed to optimize the optical design (i.e. coating materials used as anti-reflective layer for refractive index matching to reduce optical back reflections at the fiber optic termination) and to package the optical elements inside the sensor itself (for example the glue materials used to fix optical elements as mirrors, lens, fiber, etc.).

EP 1089062 discloses an optical sensor according to the preamble of claim 1 but wherein the end parts of the waveguides must be parallel one to the other to form a Fabry-Perot interferometer cavity.

BRIEF SUMMARY OF THE INVENTION

In view of the state of the art, it is an object of the present to provide an optical sensor for contactless pressure measurements which is more efficacious with respect to the known ones and has increased reliability with the possibility to use it in harsh industrial environment.

According to the present invention, said object is achieved by means of an optical sensor for pressure measurements comprising a sensor head, said sensor head including:
a diaphragm having a first surface in contact with a fluid of which the pressure has to be measured and a second surface opposite to the first surface,
a body with a tubular cavity,
means arranged inside the tubular cavity, associated with the second surface of the diaphragm and movable longitudinally inside said tubular cavity in response to the deformation of the diaphragm, said means including a reflective surface,
an end part of waveguide means arranged inside the tubular cavity and having the end surface faced to and not in contact with the reflective surface of said means, said waveguide means being connected to a light source and a receiver respectively to send to said means the light beam deriving from the light source and to collect at the receiver the light beam reflected from the reflective surface of said means, the intensity of the collect light beam being dependent on the distance between the end surface of the end part of waveguide means and the reflective surface, characterized in that
the end surface of the end part of waveguide means is tilted with respect to a plane orthogonal to the optic axis of a first angle having a value such that the incident angle of the light beam deriving from the light source is less than the critical angle between the waveguide means and the air and greater than the critical angle of the waveguide means, and
the reflective surface of said means is tilted with respect said plane orthogonal to the optic axis of a second angle equal to the escaping angle of the light beam from said end surface of the end part of waveguide means.

Said optical sensor is of the "Intensity modulated" optical sensor type and it is based on an optimized optical design to improve SNR and sensitivity of the sensor and on a fabrication method to allow this optical sensor to be used in harsh industrial environment where very high operating temperatures are reached.

The use of the optical sensor with said improved sensitivity and increased Signal to Noise Ratio at the receiver side, allows the easier detection of very small displacement of the pressure sensing diaphragm, when high pressure range have to be measured using a thicker diaphragm needed to avoid its break under the effect of the high pressure.

The use of optical sensor for pressure measurement for a contactless optical measurement of pressure, means that no direct mechanical contact of the movable pressure sensing diaphragm with other parts takes place inside the sensor head (in contrast with the case of piezo-resistive, and piezoelectric sensors where a direct contact between the detector chip and the movable with pressure diaphragm is needed to generate the output voltage inside the sensor head). This "contactless" feature, together with the ability of said optical sensor to be used in harsh industrial conditions where high process temperatures are reached and the ability of said optical sensor to be used in harsh industrial conditions where high pressure value are reached, allows said optical sensor to be used in automotive field for pressure measurement in cylinder combustion chamber; as matter of fact, considering the very high value of revolutions per minute of the engine, pressure measurement performed in a "contactless" way is mandatory to increase the sensor robustness avoiding the break of the sensor due to attrition between the movable deformable diaphragm and other sensor parts as in the case of piezoelectric and piezo-resistive sensors. On the other side, the very high temperatures and pressure reached in the combustion chamber (700° C./200 Bar) requires the optical sensor to be implemented with a robust optical design based on materials which are compatible with so high temperatures and on a thick enough diaphragm able to resist to the high pressure range and to fast pressure changes.

In the optical sensor according to the present invention, the light coming from a light source, for example LED or LASER, is driven in front of a reflective surface of a diaphragm deformable with pressure using a single mode or multimode waveguide, preferably a single mode or multimode optic fiber. The end surface of this fiber is placed just in front of the diaphragm an very close to it. This diaphragm is mounted or sealed on the body sensor head termination.

A suitable optical receiver, for example a PIN or APD, is used to detect the intensity of the reflected light beam coming back from the said reflective surface of said diaphragm and recollected back by the same said fiber end surface placed inside the sensor head just in front of the internal surface of the diaphragm; the other external surface of said diaphragm is in direct contact with a fluid or gas through a cavity on a container where this fluid or gas generates the pressure to be measured by the sensor head. The sensor head is arranged, preferably mounted or screwed, in this cavity placed on a wall of said container. The intensity of the reflected light beam collected by the said fiber end surface depends on the deformation of the diaphragm, particularly on the movement of the central position of the diaphragm, which in turn depends on the pressure inside the container. When the pressure inside the container changes, the reflective surface of the deformable diaphragm accordingly moves and the signal intensity of the reflected light beam changes too.

In the optical sensor according to the present invention, the end surface of the waveguide means, preferably the optic fiber, used inside the sensor head, is angled cut with an optimized angle able to reduce the optical noise level at the receiver side coming from Fresnel back reflection which always occurs at the fiber end surface; as matter of fact, Fresnel reflection happens always when a light beam reaches an optical interface where a refractive index mismatch takes place, as in the case of fiber end surface due to the big difference between fiber glass and air refractive index. The angled cut fiber end surface used in the present invention is optimized in such a way that the reflected light at the fiber end surface due to intrinsic Fresnel reflection is not driven back anymore by the optical fiber itself; this happens when the reflected rays from Fresnel reflection have an incident angle inside the optic fiber, that is the angle wherein the reflected light beam incises the interface between fiber core and cladding, less than the critical angle of the used fiber. Reflected light due to Fresnel reflection is main responsible of the optical noise level increase at the receiver side which, in turn, dramatically degrades the SNR of the optical sensor. Using an angled cut fiber end surface, the direction of the escaping optical beam is deflected away from the optical fiber axes according with the Snell refraction law; in order to maximize the intensity of reflected light collected by the angled cut fiber end surface, the reflective surface of the pedestal has to be properly tilted to reflect the incident optical beam back to the same point where it escaped from the fiber itself.

Moreover, the use of the angled cut fiber end surface allows to remove the negative effect on the receiver performance of Fresnel back reflection without using any antireflective coating materials, which are not compatible with high temperature operating conditions; this makes the sensor based on the present invention, well suitable for the use in harsh industrial environment where very high temperatures are reached,

BRIEF DESCRIPTION OF THE SEVERAL VIEWS OF THE DRAWINGS(S)

For a better understanding of the present invention, a preferred embodiment thereof is now described, purely by way of non-limiting example and with reference to the annexed drawings, wherein:

FIGS. 2a-2c show a schematic (FIG. 2a) of the optical sensor head of the optical sensor according to the present invention, the section of the optical sensor head according to line II-II (FIG. 2b) and a part of the optical sensor head in more detail (FIG. 2c);

DETAILED DESCRIPTION OF THE INVENTION

Figure 1:
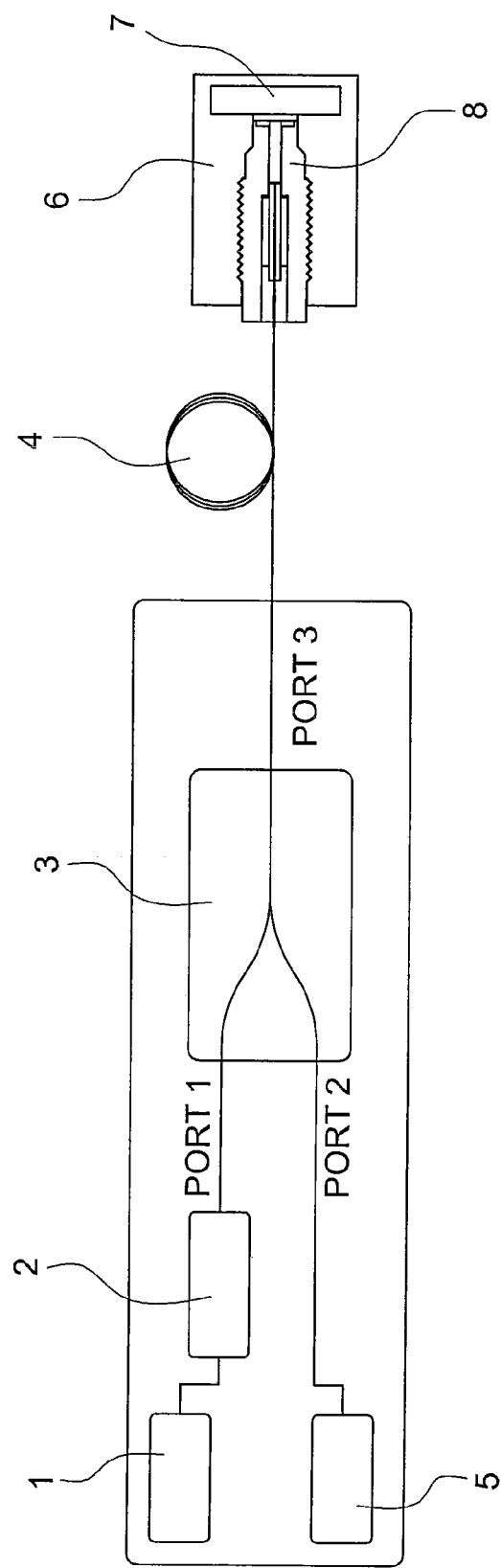
FIG. 1 is a schematic of an optical sensor for pressure measurement according to the present invention.
Figure 2C:
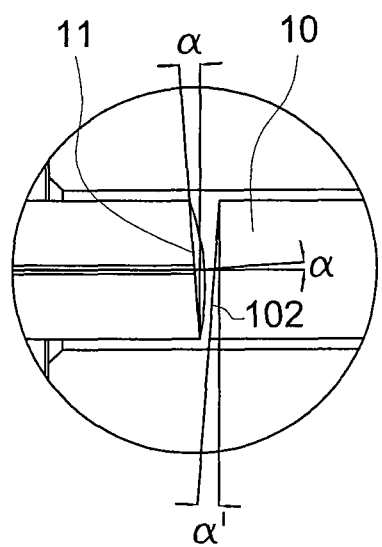
Figure 3:
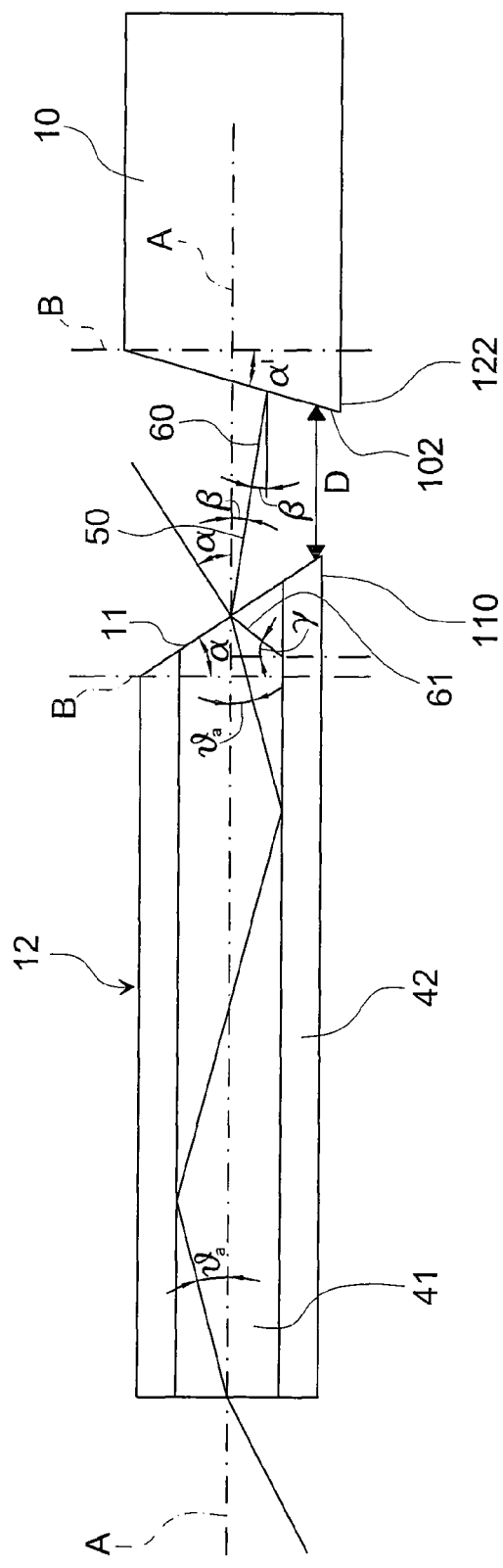
FIG. 3 shows in more detail the angled optic fiber end surface and the pedestal of the optical sensor head in FIG. 2b.

An optical sensor for pressure measurements according to the present invention is shown in FIGS. 1-3. Specifically the optical sensor comprises (FIG. 1), an optical source 1, for example a LED or a LASER source, which is connected by means of a fiber to an optical isolator 2 and the optical isolator is further optically connected to an input port PORT 1 of a directional optical coupler 3. The optical isolator 2 is needed to avoid that the light back reflected reaches the optical source possibly producing some optical instability of the source itself. The directional optical coupler 3 comprises another input port PORT 2 which is optically connected by means of a fiber with a receiver 5, for example a PIN or an APD; the output port PORT 3 of the directional optical coupler 3 is optically connected to the input of a waveguide means 4, for example a single mode or multimode optical fiber. The length of this waveguide means 4 may be done long enough from few meters to some kilometers to remotely reach the point where the pressure parameter has to be measured by means of an optical sensor head 8, allowing to separate the location where the active electronic and optical components are placed and the point where only the passive optical sensor head 8 is arranged.

The optical sensor head 8 is arranged, preferably is mounted by screwing, on a cavity of the container 6 limiting a volume 7 filled inside by the fluid or gas that generates the pressure to be measured by the optical sensor.

The head 8 of the optical sensor is shown in more detail in FIGS. 2a-2c. The head 8 (FIG. 2b) comprises a diaphragm 9, preferably circular, which is designed to be thin enough to be deformable when a pressure is applied on its external surface 91, that is the surface which is in direct contact with the fluid or gas inside the container and of which the pressure has to be measured; on the other side, the diaphragm 9 must be thick enough to be reliable when the high pressure is applied.

The head 8 of the optical sensor comprises a tubular cavity 200 inside it and preferably orthogonal to the external surface 91 of the diaphragm 9, The internal surface 92 of said diaphragm, that is the surface opposite to the external surface 91 and faced or internal to the tubular cavity 200, can be tilted with respect to the orthogonal plane B to the optic axis A according to an angle α', but preferably, the internal surface 92 of the diaphragm 9 is orthogonal to longitudinal axis A and faced to the tubular cavity 200; a pedestal 10 is placed in contact with the internal surface 92. In more detail the end surface 101 of the pedestal 10 is placed, mounted, soldered or directly built on the internal surface 92 of the diaphragm 9. The pedestal 10 has the other end surface 102, opposite to the end surface 101, reflective and tilted with respect to the orthogonal plane B to the optic axis A according to an angle α' (FIG. 2c and FIG. 3). The pedestal 10 is used as spacer increasing the distance between the external surface 91 of the diaphragm 9 and the end part 12 of the waveguide means 4; in this way the waveguide means 4 is exposed to a lower and safer temperature to maintain the feature of well driving the light beam.

Preferably, in order to make the surface 102 of the pedestal more reflective, it is polished and metal coated (if needed) to increase its reflectivity. The diaphragm 9 with the pedestal 10 is mounted inside the head 8 of the optical sensor 1 and sealed to the head 8 by laser welding.

An end part 12, of the waveguide means 4 is placed in front of the reflective internal surface 102 of the pedestal 10. The end part 12 has an end surface 11 tilted with respect to the orthogonal plane B to the optic axis A according to an angle a and is needed to perform the following two functionalities:

a) to drive in front of the reflective surface 102 of the pedestal the optical beam probe 50 coming from the optical source 1 and b) to collect the reflected light beam 60 from the reflective surface 102 of the pedestal 10 and driving back the reflected light beam 60 to the receiver 5.

When a pressure value able to deform the diaphragm 9 is applied from the fluid or gas inside the container 6, the pedestal 10 moves along the longitudinal direction, that is along the optic axis A, inside the tubular cavity 200 according to the applied pressure toward the end surface 11 of the end part 12 which is not in contact with the reflective surface 102 of the pedestal 10 but placed in front of the pedestal 10 at an opportune distance D, that is a distance such to assure that the maximum deformation of the diaphragm 9 does not move the pedestal 10 to be in contact with the end part 12 of the waveguide means 4.

More is the pressure applied, more is the displacement of the pedestal 10 toward the end surface 11 and more is the optical coupling of the reflected light beam 60 collected by the end part 12, which is in turn a direct measure of the pressure parameter, that is more is the intensity of the reflected light beam 60 collected from the receiver 5 and more is the detected pressure value. A section of the end part 12 is metalized on the external side in order to allow this sector of the end part 12 to be soldered inside a thru via hole of a metal or ceramic ferule 13. The ferule 13 with the fixed end part 12 inside is further soldered through the metal sleeve 14. The metal sleeve 14 is mounted inside the body 15 of the sensor head 8 and rotated to reach the maximum optical coupling between the reflected light beam 60 from the reflective surface of the pedestal 10 and the end surface 11; the sleeve 14 is also sealed to the body 15, The end surface 11 of the end part 12 of the waveguide means 4 is angled cut at an optimized tilt angle α with respect to the plane B, which is able to minimize the capability of the optic fiber itself to drive back to the receiver 5 the optical beam probe 50 coming from the optical source 1; the optical reflection is due to Fresnel reflection which always happens at the waveguide end termination where a mismatch to glass to air material index mismatch occurs and due to the different refraction indexes of the waveguide means 4, particularly the refraction index $n_1$ of the core 41 if an optic fiber is used as waveguide means 4, and the air $n_0$. Reducing at the receiver the back reflection level due to Fresnel reflection means to dramatically reduce the optical noise level measured by the receiver.

The waveguide means 4, preferably an optic fiber comprising the core 41 and the cladding 42, is able to drive a light beam inside it when an internal propagating light beam is incident at the core-cladding layer interface with an incident angle γ more than the critical angle θhd c, being the critical angle $θ_c$ the minimum incident angle formed with respect to the plane B orthogonal to said interface, where a total beam reflection occurs, due to the mismatch of the optic fiber core and cladding refractive index $n_1$, $n_2$.

The end surface 11 of the end part 12 of waveguide means 4 is tilted with respect to the plane B of a first angle a and the reflective surface 102 of said means 10 is tilted with respect to the plane B of a second angle α'. The first angle a is selected to assure light beam 50 deriving from the source 1 incises the end surface 11 in contact with air with an angle less than the critical angle $θ_{c-air}$ between the waveguide means 4 and the air so that the light beam 50 is not drive back to the receiver 5.

The reflected beam from the end surface 11 inside the end part 12 is absorbed by the same waveguide means, particularly by the cladding 42, and is not drive back to the receiver 5 while the refracted part of the light beam 50 is emitted from the end part 12 with an escaping angle β.

Preferably, the first angle α of the end surface 11 is defined as the angle able to reflect back the Fresnel reflected beam from said fiber end tip in such a way that this reflected beam 61 has an incident angle γ with the internal core-cladding interface of the fiber which is less than the critical angle $θ_c$ of the fiber itself (FIG. 3): in this way the reflected beam due to Fresnel reflection is not driven anymore by the fiber back to the receiver side but it is absorbed soon into the cladding.

The first angle α used to cut the end part 12 of the optic fiber 4 depends on the specific difference of the refractive index $n_1$ of the core layer 41 of the fiber itself and the refractive index $n_0$ of the air.

For example, it is possible to use as waveguide means 4 a single mode optic fiber with the following parameters shown in the table:

| n air ($n_0$) | n CORE ($n_1$) | Delta n ($n_1 - n_2$)/$n_1$ | α (°) | Fibre core diameter (μ) | Fibre cladding diameter (μ) | $n_2$ | Fibre N.A. | Critical angle θc (°) | Escaping angle β (°) |
|---|---|---|---|---|---|---|---|---|---|
| 1 | 1.45 | 0.01 | 8 | 8.2 | 125 | 1.4454 | 0.21 | 81.9 | 3.7 | where the parameters are calculated by means of the following formulas starting from refractive indexes of core and cladding:

NA=ARCSEN $(n_1^2-n_2^2)^{1/2}$ (NA: Numerical Aperture)

$\theta_a$=ARCSEN (NA) ($\theta_a$: acceptance angle formed between the light beam 50 and the optic axis A)

$\theta_c$=ARCSEN $(n_2/n_1)$ ($\theta_c$: critical angle of the optic fiber)

$\theta_{c\text{-}air}$=ARCSEN $(n_1/n_0)$ ($\theta_{c\text{-}air}$ critical angle between the core layer 41 of the optic fiber and the air)

$\theta_c'$=90°$-\theta_c$=ARCCOS $(n_2/n_1)$ ($\theta_c'$: complementary critical angle)

The optical beam 50 transmitted through the angled end surface 11 is deflected from the fiber optic axis A according to Snell Refraction Law with an escaping angle β calculated as:

β=ARCSEN $((n_1/n_0) \cdot \text{SEN}(\alpha))-\alpha$ (β: escaping angle from angled cut surface 11 which is formed between the refracted light beam 50 and the optic axis A; α: fiber cut angle; $n_0$: refractive index of air=1).

The escaping beam from the angled end surface 11 has an incident angle φ with respect to the reflective tilted surface 102 of the pedestal 10, calculated as:

φ=α'−β where α' is the tilt angle of the reflective surface 102 of the pedestal 10.

In order to maximize the signal reflected from the reflective surface 102 of the pedestal 10 and collected by the end part 12, the condition φ=0 must be satisfied.

The previous condition means that the tilt angle α' of the reflective surface 102 of the pedestal 10 must satisfy the following condition: α'=β.

Therefore the reflective surface 102 of the pedestal 10 must been cut with an angle equal to the escaping angle β of the light beam 50 coming from the angled fiber end surface 11; in this way the reflected light beam 60 hints the end surface 11 with an incident angle β and the refracted part of the reflected light beam 60 is driven back by the end part 12 of the waveguide means 4 with an incident angle $\theta_a$, that is the incident angle of the light beam 50 deriving from the light source 1.

The initial distance between the reflective surface 102 of the pedestal 10 and the angled end surface 11 must be fixed at a spatial value able to optimize the measurement of the collected optical signal; specifically, this optimized distance must be small enough to increase the optical coupling between reflected light from the reflecting surface 102 of the pedestal 10 and back collected light by the end part 12 itself.

The pressure measurements effectuated by means of the optic sensor according to the present invention depend on the distance D between the end surface II and the reflective surface 102 of the pedestal 10.

In fact an increase of said distance D corresponds to a decrease of the intensity of the light beam collected from the receiver 5, preferably collected by the end of the waveguide and guided back to the receiver; this occurs because at an increase of the distance D the incident point of the reflected light beam 60 on the end surface 11 moves toward the part of the end surface corresponding to the cladding by reducing the quantity of the light beam refracted inside the optic fiber 12. In fact the reflected light beam 60 is concentrated inside a light cone of numerical aperture NA and so the increase of the distance D will result in a decrease of the optical power density that incises on the end surface 11 of the waveguide 4, reducing the amount of refracted light guided inside the waveguide.

Therefore more the pedestal 10 is close to the optic fiber termination 12 (which corresponds to a high deformation of the diaphragm 9, that is a high pressure value), more the measured pressure value is high because the reflected light beam 60 hints the core layer 41 of the end surface 11, while more the pedestal 10 is away from the optic fiber termination 12 (which corresponds to a low deformation of the diaphragm 9, that is a low pressure value), more the measured pressure value is low because the reflected light beam 60 hints partially the core layer 41 and the cladding layer 42 of the optic fiber 12 since only the part of the optical beam hinting the core layer 41 is driven back of the optic fiber and is collected by the receiver 5.

The optical sensor described in the present invention doesn't need of any dielectric anti reflecting coating, because the method used is just based on the optimization of the angled cut fiber end surface 11 allowing the deflection of Fresnel reflection to such an angle which the fiber is not able to drive the light.

Preferably the end surface 11 of the end part of the waveguide means 4 and the reflective surface 102 of the pedestal must be longitudinally arranged so that the protruding end portion 110 of the end surface 11 is faced to the protruding end portion 122 of the reflective surface 102.

Another major advantage on the measurement of the optical signal with the optical sensor according to the invention refers to the fact that the use of said angled fiber end surface 11 allows even to avoid any optical standing waves typically occurring in the optical cavity formed by the reflective surface of the pedestal and the fiber cut termination when flat fiber termination is used. Avoiding these optical standing waves due to optical cavity reflections makes the optical signal measurement very stable and precise eliminating optical signal oscillations and still increasing signal to noise ratio at the receiver side.

If the end part 12 inside the sensor head is selected to be compatible to be used with very high operating temperatures, the optical sensor is fully compatible to be used in harsh environment where these high temperatures are reached.

Figure 4A:
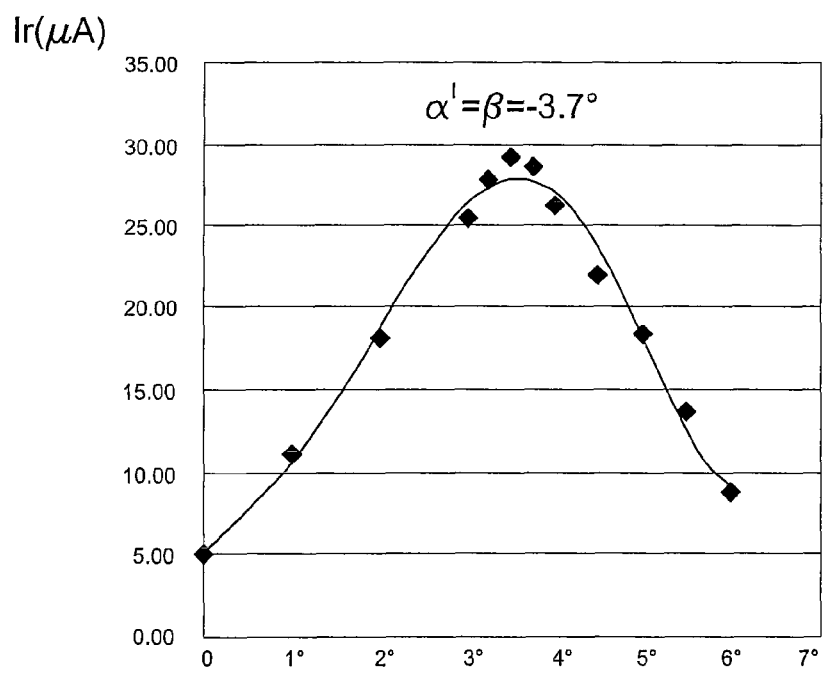
FIGS. 4a, 4b are measurements of optical reflected signal coming from a movable reflective surface using the optical sensor according to the present invention.
Figure 4B:
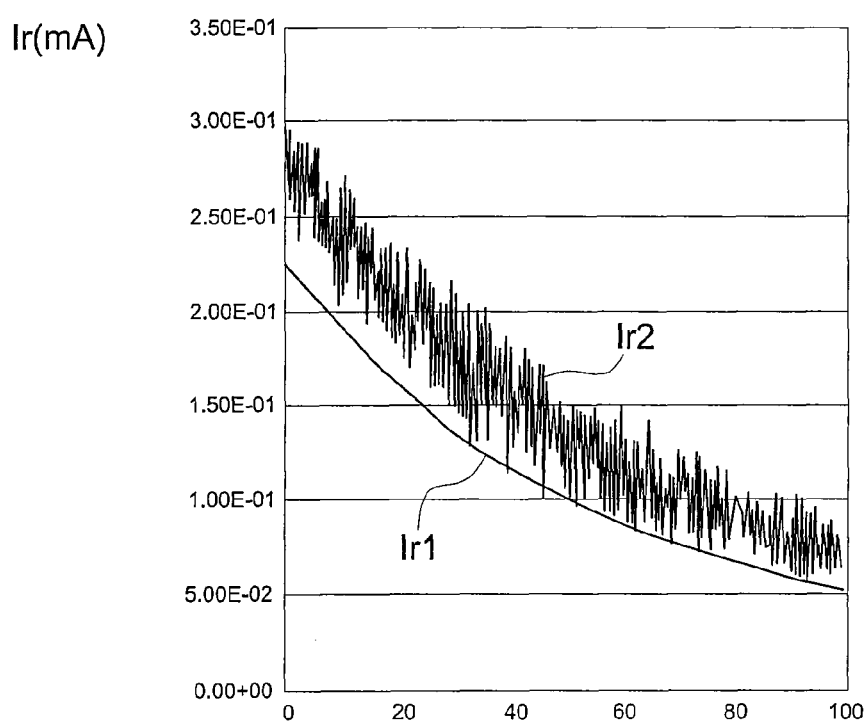

FIGS. 4a, 4b show the measurements of the optical signal detected by the receiver 5 after being collected by the fiber placed in front of a movable reflective surface 102 of the pedestal 10. A laser with an operating wavelength of 1550 nm has been used as optical source 1 with −3 dBm optical output power. A PIN photo detector has been used as receiver 5 for optical power measurement. The reflecting surface 102 has been moved from the fiber end termination 12 with sub micrometric resolution steps. A single mode optic fiber 4 has been used. The measurement of FIG. 4a shows the optimization of the received optical signal, that is the photocurrent Ir, at the receiver 5 by changing the tilt angle of the reflective surface 102 with a fixed position of the movable reflective surface, showing a maximum at the tilt angle where the condition α'=β is verified. In this case the angle α'=β=3.7° and the angle α=8°.

FIG. 4b shows the received optical signals, that is the photocurrents Ir1 and Ir2, at the receiver side 5 with the reflective surface tilted respectively with the previous defined fixed tilt angle α'=β=3.7° (able to guarantee the maximum optical coupling between the collecting fiber and the reflective surface) and with another fixed tilt angle α'β=0° in function of the distance D; the optical signal decreases by increase the distance between the fiber termination 12 and the reflective surface 102, showing a good linearity and sensitivity in the case of the photocurrent Ir1 (for example surface displacement of 1 um corresponds to a 1.5% measured optical signal variation that is easily detected with standard receiver) while in the case of the photocurrent Ir2 the noise level is increased by a factor 1000 with respect to Ir1. Another important evidence coming from FIG. 4b is that the operating distance range where a measurable variation of the optical received signal is still observed at the receiver side is well limited in the case of a not optimized fiber termination with a standard flat end surface due to the higher noise level.

Figure 5:
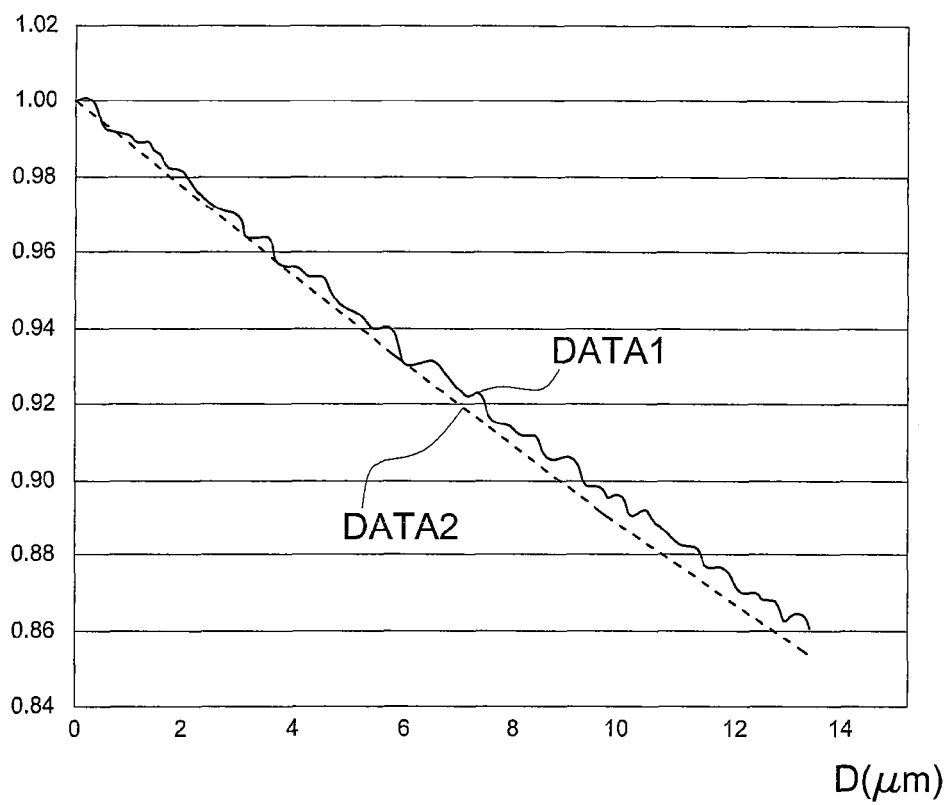
FIG. 5 is a comparison of simulated and measured optical reflected signal from the optic fiber end surface of the optical sensor according to the present invention.

FIG. 5 shows a comparison between the measured data DATA1 and the calculated data DATA2 of the optical reflected signal from the optic fiber end surface 11 according to the following approach used to simulate the illumination of the reflective surface by the escaping beam from the fiber end surface 11 and the optical signal collected by the same fiber after the reflection on the reflective surface 102; the data DATA1 and DATA2 are provided in function of the distance D. In the model, the fiber termination 12 is considered itself as an optical source with a constant optical density energy over the circular core of 4.5 um radius. The optical signal collected by the fiber after the reflection on the reflective surface is calculated at different distances from the fiber termination as the overlapping of Gaussian beams coming from different illuminating area elements which the fiber core has been divided; each surface element is considered as a single optical cone source with escaping angle equal to $\beta$ and the divergence angle equal to half of the NA of the fiber. The position of the center of each cone and its radius after the reflection on the reflecting surface is calculated according to law of optical reflections. The center of the cone is considered as the center of Gaussian beam and the radius of the cone is considered as equal to $3\sigma$ of the Gaussian distribution, meaning that 99,999% of the optical signal is inside the cone.

The invention claimed is:

1. An optical sensor suitable for pressure measurements comprising a sensor head, said sensor head including:
    a diaphragm having a first surface in contact with a fluid of which the pressure has to be measured and a second surface opposite to the first surface,
    a body with a tubular cavity,
    a pedestal arranged inside the tubular cavity, associated with the second surface of the diaphragm and movable longitudinally inside said tubular cavity in response to the deformation of the diaphragm, said pedestal including a reflective surface,
    an end part of waveguide means arranged inside the tubular cavity and having the end surface faced to and not in contact with the reflective surface of said means, said waveguide means being connected to a light source and a receiver respectively to send to said means the light beam deriving from the light source and to collect at the receiver the light beam reflected from the reflective surface of said pedestal for pressure measurement, the intensity of the collect light beam being dependent on the distance between the end surface of the end part of the waveguide means and the reflective surface, wherein:
    the end surface of the end part of the waveguide means is tilted with respect to a plane orthogonal to the optic axis of a first angle having a value such that an incident angle of the light beam deriving from the light source is less than a first critical angle between the waveguide means and the air and greater than a second critical angle of the waveguide means, and the reflective surface of said pedestal is tilted with respect said plane orthogonal to the optic axis of a second angle equal to an escaping angle of the light beam from said end surface of the end part of waveguide means.

2. The optical sensor according to claim 1, wherein said pedestal is the diaphragm and the second surface opposite to the first surface is said reflective surface.

3. The optical sensor according to claim 1, wherein said pedestal has an end surface arranged in contact with the second surface of the diaphragm while the end surface of the opposite other end being said reflective surface.

4. The optical sensor according to claim 3, wherein the second surface of the diaphragm is faced to the tubular cavity.

5. The optical sensor according to claim 1, wherein said first angle has a value such that the reflected portion of the light, beam deriving from the light source and incising said end surface of the end part of waveguide means is absorbed by the waveguide means.

6. The optical sensor according to claim 1, wherein said waveguide means are an optic fiber with a core and a cladding.

7. The optical sensor according to claim 6, wherein said first angle has a value such that the reflected portion of the light beam deriving from the light, source and incising said end surface of the end part of waveguide means is absorbed by the cladding of the optic fiber, that is the reflected portion of the light beam has an incident angle with the internal core-cladding interface of the optic fiber which is less than the critical angle of the optic fiber itself.

8. The optical sensor according to claim 6, wherein said first angle has a value of 8°.

9. The optical sensor according to claim 8, wherein said second angle has a value of 3.7°.

10. The optical sensor according to claim 1, wherein the end surface of the end part of the waveguide means and said reflective surface are longitudinally arranged so that the protruding end portion of said end surface is faced to the protruding end portion of said reflective surface.

* * * * *